(12) United States Patent
Veilleux, Jr. et al.

(10) Patent No.: US 9,512,783 B2
(45) Date of Patent: Dec. 6, 2016

(54) AIRCRAFT FUEL SYSTEM

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 140 days.

(21) Appl. No.: 14/541,929

(22) Filed: Nov. 14, 2014

(65) Prior Publication Data

US 2016/0138473 A1 May 19, 2016

(51) Int. Cl.
| | |
|---|---|
| F02C 7/22 | (2006.01) |
| F02C 7/236 | (2006.01) |
| F02C 9/28 | (2006.01) |
| F02C 9/30 | (2006.01) |
| G05D 7/06 | (2006.01) |
| F02C 7/224 | (2006.01) |

(52) U.S. Cl.
CPC .............. *F02C 7/22* (2013.01); *F02C 7/236* (2013.01); *F02C 9/28* (2013.01); *F02C 9/30* (2013.01); *G05D 7/0682* (2013.01); *F02C 7/224* (2013.01)

(58) Field of Classification Search
USPC ........................ 137/565.33; 60/39.281, 734
See application file for complete search history.

(56) References Cited

U.S. PATENT DOCUMENTS

| | | | |
|---|---|---|---|
| 2,538,582 A | | 1/1951 | Mordell et al. |
| 2,813,394 A | | 11/1957 | Ballantyne et al. |
| 3,186,167 A | | 6/1965 | Chute |
| 3,696,612 A | | 10/1972 | Berman |
| 3,738,104 A | | 6/1973 | Rosa |
| 4,201,044 A | * | 5/1980 | Dodd ........................ F02C 7/22 |
| | | | 210/132 |
| 6,487,847 B1 | | 12/2002 | Snow et al. |
| 6,651,441 B2 | * | 11/2003 | Reuter ..................... F01D 25/20 |
| | | | 417/292 |
| 6,996,970 B2 | | 2/2006 | Lorenz |
| 7,237,535 B2 | * | 7/2007 | Eick .......................... F02C 7/22 |
| | | | 123/478 |
| 8,256,222 B2 | * | 9/2012 | Mahoney ................ F02C 7/222 |
| | | | 123/495 |
| 2012/0204532 A1 | | 8/2012 | Potel et al. |
| 2013/0283811 A1 | * | 10/2013 | Potel ......................... F02C 7/22 |
| | | | 60/776 |

FOREIGN PATENT DOCUMENTS

| | | |
|---|---|---|
| EP | 0145636 A1 | 6/1985 |
| EP | 2088302 A2 | 8/2009 |
| EP | 2093400 A2 | 8/2009 |

OTHER PUBLICATIONS

Extended European Search Report for EP Application No. 15192926.2, dated Mar. 17, 2016, 6 pages.

* cited by examiner

*Primary Examiner* — Mary McManmon
*Assistant Examiner* — Richard K Durden
(74) *Attorney, Agent, or Firm* — Kinney & Lange, P.A.

(57) ABSTRACT

A fuel supplying system includes a primary circuit for delivering fuel from a fuel tank to a primary circuit outlet. The system also includes a first supply circuit connected to the primary circuit outlet, the first supply circuit comprising a first supply circuit pump configured to pump fuel from the primary circuit outlet to engine fuel nozzles. The system further includes a second supply circuit also connected to the primary circuit outlet. The second supply circuit includes at least one actuating device configured to receive power from hydraulic pressure of the fuel. The second supply circuit also includes a second supply circuit pump configured to pump fuel from the primary circuit outlet to an actuating device, wherein the second supply circuit pump is independent from the first supply circuit pump. The second supply circuit further includes a return circuit configured to return fuel from the actuating device to the second supply circuit between the primary circuit outlet and the second supply circuit pump.

13 Claims, 2 Drawing Sheets

AIRCRAFT FUEL SYSTEM

BACKGROUND

This invention relates generally to fuel systems, and more specifically to aircraft fuel systems.

In aircraft fuel systems, fuel is commonly pumped from a fuel tank using a low pressure mechanical fuel pump receiving indirect mechanical power from a gas turbine engine drive train. The low pressure pump moves fuel through the fuel system and through various components of the system, such as a heat exchanger and a fuel filter. Downstream of the low pressure pump, it is common for a high pressure mechanical pump, also receiving indirect mechanical power from a gas turbine engine's drive train, to receive the fuel and discharge it at a pressure higher than the pressure created by the low pressure pump. Often downstream of the high pressure pump is a bypass line containing a bypass valve for bypassing excess fuel and routing the excess fuel back to the fuel tanks.

Also downstream of the high pressure pump is a branch where fuel can be sent down one of two paths. At the end of the first path are engine fuel nozzles, which spray fuel into combustors of a gas turbine engine. In the second path are servos which use the fuel as a hydraulic pressure source. Servos control many fluids within a turbine engine system such as compressor bypass air.

The mechanically controlled pumps operate at speeds related to engine speeds, because they are indirectly mechanically powered by the turbine engine. Therefore, as the engine speed increases, so does the speed of the low pressure and high pressure pump. Because of this, a bypass valve is required to prevent pressure and flow rates from exceeding operational maximums of the components served by fuel. An effect of this is that large pumps are used to ensure minimum flow rates are provided to fuel nozzles at minimum engine speeds and minimum operating pressure of the servo systems. While this system is operable, significant improvements may be made to reduce operating cost and increase efficiency.

SUMMARY

In one embodiment, a fuel supplying system includes a primary circuit for delivering fuel from a fuel tank to a primary circuit outlet. The system also includes a first supply circuit connected to the primary circuit outlet, the first supply circuit comprising a first supply circuit pump configured to pump fuel from the primary circuit outlet to engine fuel nozzles. The system further includes a second supply circuit also connected to the primary circuit outlet. The second supply circuit includes at least one actuating device configured to receive power from hydraulic pressure of the fuel. The second supply circuit also includes a second supply circuit pump configured to pump fuel from the primary circuit outlet to an actuating device, wherein the second supply circuit pump is independent from the first supply circuit pump. The second supply circuit further includes a return circuit configured to return fuel from the actuating device to the second supply circuit between the primary circuit outlet and the second supply circuit pump.

In another embodiment, a method for supplying fuel to engine fuel nozzles and fuel powered actuating devices includes passing fuel from a fuel tank through a primary circuit to a primary circuit outlet. The method also includes pumping fuel from the primary circuit outlet, through a first supply circuit to engine fuel nozzles, wherein a first supply circuit pump is used to pump fuel through the first supply circuit. The method further includes pumping fuel from the primary circuit outlet, through a second supply circuit to actuating devices configured to receive power from hydraulic pressure of the fuel, wherein a second supply circuit pump is used to pump fuel through the second supply circuit.

DETAILED DESCRIPTION

According to the techniques of this disclosure, a fuel supply system including multiple pumps, where a main pump delivers fuel to engine fuel nozzles and an auxiliary pump delivers fuel to a servo system. The two pumps, preferably powered by electric motors, may be independently controlled to provide flow at optimized flow rates to their respective systems, thus optimizing the pumps and system for efficiency.

Figure 1:
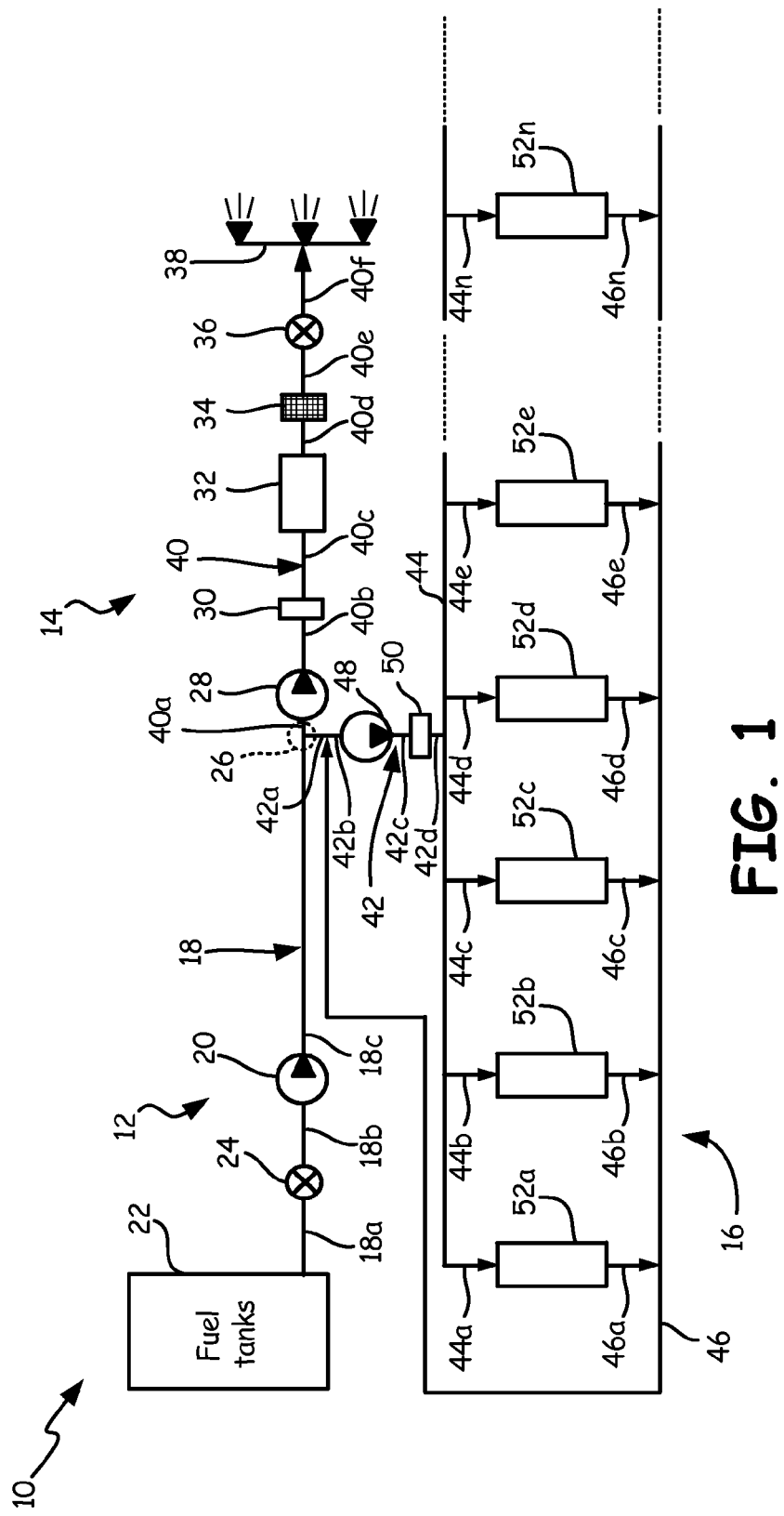
FIG. 1 is a schematic diagram of an aircraft fuel system.

FIG. 1 is a schematic diagram of an embodiment of fuel pumping system 10. Fuel pumping system 10 includes primary circuit 12, nozzle circuit 14, servo circuit 16, and circuit intersection 26.

Primary circuit 12 includes primary fuel line 18, primary fuel line portions 18a-18c, primary fuel pump 20, fuel tanks 22, and low pressure shut-off valve 24. Nozzle circuit 14 includes nozzle fuel pump 28, nozzle fuel sensor 30, fuel-oil heat exchanger 32, filter 34, high pressure shut-off valve 36, fuel nozzles 38, nozzle fuel line 40, and nozzle fuel line portions 40a-40f. Servo circuit 16 includes servo fuel pump 48, servo fuel pump line 42, servo supply line 44, servo supply line portions 44a-44n, servo return line 46, and servo return line portions 46a-46n. Servo circuit 16 also includes servo fuel sensor 50, and servo systems 52a-52n.

In primary circuit 12, fuel tanks 22 connect to primary fuel line 18 at the inlet of primary fuel line portion 18a. Downstream of fuel tanks 22 on fuel line 18 is low pressure shut-off valve 24, which connects to the outlet of primary fuel line portion 18a. The inlet of primary fuel line portion 18b connects to the outlet low pressure shut-off valve 24, and the outlet of primary fuel line portion 18b connects to the inlet of primary fuel pump 20. The outlet of primary fuel pump 20 connects to the inlet of primary fuel line portion 18c. The outlet of primary fuel line portion 18c connects to the inlet of circuit intersection 26, which is located at the end of primary fuel line 18 and the end of primary circuit 12. Circuit intersection 26 has one inlet and two outlets.

Nozzle circuit 14 begins at one outlet of circuit intersection 26. The inlet of nozzle fuel line portion 40a connects to one of the two outlets of circuit intersection 26. The outlet of nozzle fuel line portion 40a connects to the inlet of nozzle fuel pump 28. The outlet of nozzle fuel pump 28 connects to the inlet of nozzle fuel line portion 40b. The outlet of nozzle fuel line portion 40b connects to the inlet of nozzle fuel sensor 30 and the outlet of nozzle fuel sensor 30 connects to the inlet of nozzle fuel line portion 40c.

The outlet of nozzle fuel line portion 40c connects to the inlet of the fuel side of fuel-oil heat exchanger 32. The outlet of the fuel side of fuel-oil heat exchanger 32 connects to the inlet of nozzle fuel line portion 40d. The outlet of nozzle fuel line portion 40d connects to the inlet of filter 34 and the outlet of filter 34 connects to the inlet of nozzle fuel line portion 40e.

The outlet of nozzle fuel line portion 40e connects to the inlet of high pressure shut-off valve 36. The outlet of high pressure shut-off valve 36 connects to the inlet of nozzle fuel line portion 40f. The outlet of nozzle fuel line portion 40f connects to the inlet of fuel nozzles 38, which inject fuel into a combustor of a gas turbine engine.

Servo circuit 16 begins at the second outlet of circuit intersection 26. The inlet of servo fuel pump line portion 42a connects to the second downstream connections of circuit intersection 26. The outlet of servo fuel pump line portion 42a connects to the inlet of servo fuel pump line portion 42b. The outlet of servo fuel pump line portion 42b connects to the inlet of servo fuel pump 48. The outlet of servo fuel pump 48 connects to the inlet of servo fuel pump line portion 42c. The outlet of servo fuel pump line portion 42c connects to the inlet of servo fuel sensor 50 and the outlet of servo fuel sensor 50, connects to the inlet of servo fuel pump line portion 42d.

Servo circuit 16 continues where servo fuel pump line 42 terminates at the outlet of servo fuel pump line portion 42d, which connects to the inlet of servo supply line 44. Servo supply line 44 branches into to servo supply line portions 44a-44n, respectively. Each outlet of servo supply line portions 44a-44n connects to the inlet of a servo system 52a-52n. For example, the outlet of servo supply line portion 44a connects to the inlet of servo system 52a. These connections are downstream of the outlet of servo fuel pump line 42. The outlets of servo supply lines portions 44a-44n are also the outlet and terminations of servo supply line 44.

The outlets of servo systems 52a-52n connect to the inlets of servo return line 46, which are also the inlets of servo return line portions 46a-46n. These connections occur downstream of servo systems 52a-52n. Servo return line portions 46a-46n merge into servo return line 46 before returning to servo fuel pump line 42. Servo return line 46 connects to servo fuel pump line 42 at the connection between the outlet of servo fuel pump line 42a and the inlet of servo fuel pump line 42b. This connection of servo return line 46 to servo fuel pump line 42 is the termination of servo return line 46.

Primary fuel pump 20 of primary circuit 12 creates a pressure differential which draws fuel out of fuel tanks 22 and into primary fuel line 18. Fuel is drawn through primary fuel line portion 18a and through low pressure shut-off valve 24. Low pressure shut-off valve 24 can shut off flow from fuel tanks 22 when pressure in primary fuel circuit 12 falls below a minimum threshold. Low pressure shut-off valve 24 may receive an electrical signal instructing the valve to close, or low pressure shut-off valve 24 may include a mechanical sensing portion that measures the pressure of primary fuel line 18 closes low pressure shut-off valve 24. After passing through low pressure shut-off valve 24, the fuel continues through primary fuel line portion 18b and into primary fuel pump 20, which propels the fuel out and into primary fuel line portion 18c and on to fuel line intersection 26.

Upon reaching fuel line intersection 26, the fuel is able to, but does not have to, diverge, traveling to either nozzle fuel circuit 14 or servo fuel circuit 16. The direction and quantity of fuel that flows to nozzle fuel circuit 14 or servo fuel circuit 16 is determined by the flow rates induced by servo fuel pump 48 and nozzle fuel pump 28.

The flow induced by nozzle fuel pump 28 will be drawn through nozzle fuel line portion 40a and into nozzle fuel pump 28, where it will be propelled out to nozzle fuel line portion 40b and into nozzle fuel sensor 30. Nozzle fuel sensor 30 may then sense conditions of fuel passing through nozzle fuel sensor 30. For example, nozzle fuel sensor 30 may sense the volumetric flow rate and pressure of the fuel passing through nozzle fuel sensor 30. Nozzle fuel sensor 30 can then send output signals based on the conditions it has sensed.

Upon exiting nozzle fuel sensor 30, the fuel is forced through nozzle fuel line portion 40c and into one chamber of fuel-oil heat exchanger 32, where the fuel flow cools the oil flow passing through another chamber of fuel-oil heat exchanger 32. Simultaneously, the fuel flow passing through fuel-oil heat exchanger 32 is heated by the oil. In some situations, the opposite thermal transfer may occur, wherein the fuel is cooled and the oil is heated. After leaving fuel-oil heat exchanger 32, the fuel travels through nozzle fuel line portion 40e and through high pressure shut-off valve 36. High pressure shut-off valve 36 can close, stopping fuel flow from reaching nozzles 38 when pressure in nozzle fuel circuit 14 rises above a maximum threshold. High pressure shut-off valve 36 may receive an electrical signal instructing the valve to close, or high pressure shut-off valve 36 may include a mechanical sensing portion that measures the pressure of nozzle fuel line 18 which closes high pressure-shut off valve 36. After passing through high pressure shut-off valve 36, the fuel continues through nozzle fuel line portion 40f to nozzles 38, where the fuel is injected into a combustor of a gas turbine engine.

The flow induced by servo fuel pump 48 will be drawn through servo fuel line portion 42a, servo fuel line portion 42b, and into servo fuel pump 48, where it will be propelled out to servo fuel line portion 42c and into servo fuel sensor 50. Servo fuel sensor 50 may then sense conditions of the fuel passing through nozzle fuel sensor 50. For example, servo fuel sensor 50 may sense the volumetric flow rate and temperature of the fuel passing through servo fuel sensor 50. Servo fuel sensor 50 can then send output signals based on the conditions it has sensed.

Upon exiting servo fuel sensor 50, the fuel is forced through servo fuel line portion 42d and into servo supply line 44. Once in servo supply line 44, the fuel may be routed to servo systems 52a-52n to meet their demand. For example, when a servo system demands a high fuel flow rate or pressure, more fuel may be routed from servo supply line 44 through servo supply line portion 44a and into servo system 52a. Servo systems 52a-52n use the fuel as a source of hydraulic power to operate the servos which control actuators within an aircraft system. For example, servo system 52a may use the fuel provided to it as hydraulic power to drive an actuator that allows compressed air to escape from a high pressure compressor stage within a gas turbine engine.

Upon exiting servo systems 52a-52n, fuel can travel to servo return line portions 46a-46n and merge into servo return line 46, where the fuel will be returned to the upstream side of servo fuel pump 48 at the intersection of servo fuel line portions 42a and 42b. Servo fuel pump may then re-pressurize and recirculate the fuel into servo fuel pump line 42.

Primary fuel pump 20 may be mechanically driven by the drive train of a gas turbine engine, or primary fuel pump 20 may be driven by an electric motor. Nozzle fuel pump 28 and servo fuel pump 48 may also be driven by a mechanically powered motor, or they may be driven by electrically powered motors as described in greater detail in FIG. 2.

Figure 2:
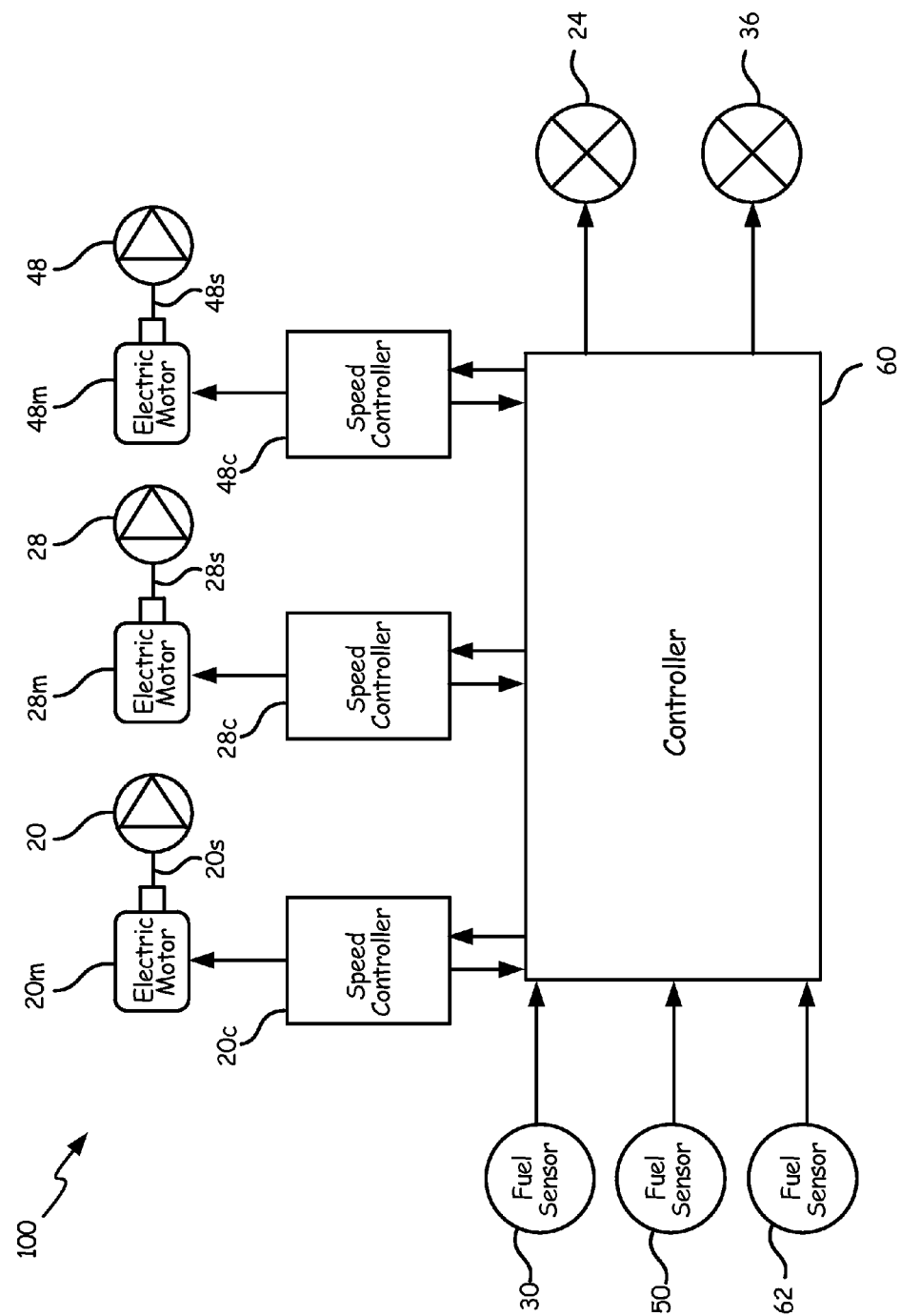
FIG. 2 is a block diagram of a control system for controlling the aircraft fuel system of FIG. 1.

FIG. 2 is a block diagram of control system 100 for controlling aircraft fuel pumping system 10 in accordance with an embodiment of the present disclosure.

Control system 100 includes primary fuel pump 20, primary fuel pump motor 20m, primary fuel pump shaft 20s, and primary fuel pump speed controller 20c. Control system 100 further includes nozzle fuel pump 28, nozzle fuel pump motor 28m, nozzle fuel pump shaft 28s, and nozzle fuel pump speed controller 28c. Control system 100 also includes servo fuel pump 48, servo fuel pump motor 48m, servo fuel pump shaft 48s, and servo fuel pump speed controller 48c.

Control system 100 also includes nozzle fuel sensor 30, servo fuel sensor 50, fuel consumption inputs 62, low pressure shut-off valve 24, high-pressure shut-off valve 36, and controller 60.

Nozzle fuel sensor 30, servo fuel sensor 30, and fuel consumption inputs 62 connect electrically to controller 40. Low pressure shut-off valve 24 and high pressure shut-off valve 36 also connect electrically to controller 60. Also, speed controllers 20c, 28c, and 48c connect electrically to controller 60.

Primary fuel pump speed controller 20c also connects electrically to primary fuel pump motor 20m. Primary fuel pump motor 20m is physically coupled to primary fuel pump shaft 20s, which is also coupled to primary fuel pump 20. Nozzle fuel pump speed controller 28c also connects electrically to nozzle fuel pump motor 28m. Nozzle fuel pump motor 28m is physically coupled to nozzle fuel pump shaft 28s, which is also coupled to nozzle fuel pump 28. Servo fuel pump speed controller 48c also connects electrically to servo fuel pump motor 48m. Servo fuel pump motor 48m is physically coupled to servo fuel pump shaft 48s, which is also coupled to servo fuel pump 48.

Controller 60 outputs signals to nozzle fuel pump speed controller 28c based on calculations performed by controller 60. Nozzle fuel pump speed controller 28c converts the speed commands from a speed signal to a power output that will drive nozzle fuel pump motor 28m to rotate nozzle fuel pump motor shaft 28s at the desired speed. Nozzle fuel pump motor shaft 28s will then rotate the impeller, or other rotating component that transfers the rotating energy of the shaft 28s to the fuel, at the speed required to produce the desired flow rate to nozzles 38, as shown in FIG. 1. Controller 60 similarly controls primary fuel pump 20, primary fuel pump motor 20m, primary fuel pump shaft 20s, and primary fuel pump speed controller 20c. Controller 60 also similarly controls servo fuel pump 48, servo fuel pump motor 48m, servo fuel pump shaft 48s, and servo fuel pump speed controller 48c.

To determine the desired flow rate of nozzles 38, controller 60 receives signals from nozzle fuel sensor 30 based on sensed conditions of nozzle fuel line 40 of FIG. 1. For example, controller 60 may receive a signal based on a sensed flow rate from nozzle fuel sensor 30 and a consumption rate of nozzles 38 from fuel consumption inputs 62. In other embodiments of control system 100, additional fuel sensors and inputs may be incorporated.

Based on these signals, controller 60 calculates the optimal fuel flow rate for nozzles 38 and the required operating speed of nozzle fuel pump 28 to achieve the optimal fuel flow rate. Controller 60 may then compare the optimal fuel flow rate to the current fuel flow rate provided by nozzle fuel sensor 30, and determine whether an adjustment in fuel flow rate is required. If an adjustment is required, for example, if the fuel flow rate being produced by nozzle fuel pump 28 exceeds the demands of nozzles 38, controller 60 may send a signal to speed controller 28c to adjust the speed of nozzle fuel pump 28 accordingly. After the output of nozzle fuel pump 28 has been adjusted as described above, nozzle fuel sensor 30 may again sense the flow rate of nozzle fuel line creating a constant feedback loop regarding the flow rate of the fuel within nozzle circuit 14 of FIG. 1.

This process, which may be described as on-demand fuel consumption, allows fuel pumping system 10 to optimize the operation of nozzle fuel pump 28 for fuel consumption. Further adjustments may be made to primary fuel pump 20 based on adjustments of nozzle fuel pump 28 to optimize for efficiency, saving energy. For instance, in the example described above, nozzle fuel pump 28 produces a lower flow rate of fuel to nozzle circuit 14, which means that primary fuel pump 20 may be able to provide a lower flow rate of fuel. This means that primary fuel pump 20 may have its speed reduced by controller 60, thus optimizing for efficiency, and saving additional energy. This benefit eliminates the need to recirculate fuel from primary circuit 12 to fuel tanks 22, because primary fuel pump 20 can be controlled to meet the demands of servo fuel pump 48 and nozzle fuel pump 28. Additionally, because nozzle fuel pump 28 and servo fuel pump 48 can optimize for their systems' individual needs, primary fuel pump 20 may be removed in some embodiments, reducing weight, thereby increasing system efficiency.

In a manner similar to the optimization of the speed of nozzle fuel pump 28, controller 60 may optimize the speed of servo fuel pump 48 based on the requirements of servo circuit 16. In this scenario, servo fuel sensor 50 may sense fuel pressure downstream of servo fuel pump 48. Controller 60, in receipt of the sensed pressure signal, may compare the pressure outputted by servo fuel pump 48 to the pressure requirements of servo systems 52a-52n (received from fuel consumption inputs 62). If any of servo systems 52a-52n demand a higher pressure, the speed of servo fuel pump 48 can be increased to provide the required fuel pressure. In a similar fashion, servo fuel pump 48 may reduce its speed, or shut off entirely, when more pressure is being produced than is required by servo systems 52a-52n. Therefore, controller 60 can optimize servo fuel pump 48 for efficiency.

In one embodiment, controller 60 may command servo fuel pump 48 to run when a temperature of the fuel within servo circuit 16 is determined to be below a minimum value, such as 32° F., regardless of whether the pressure demands of servo systems 52a-52n are met. In this scenario, servo fuel pump 48 will pump fuel, which will recirculate through servo return line 46 to the inlet of servo fuel pump 48 through fuel line 42b. This process will add heat to the fuel within servo circuit 16, which will raise fuel temperatures above the minimum threshold (32° F. in the example above), preventing unwanted conditions such as freezing or sludging of the fuel within servo circuit 16.

Another benefit provided by this embodiment is that the separation of fuel provided by servo fuel pump 48 to servo circuit 16 from fuel provided by nozzle fuel pump 28 to nozzle circuit 14 allows for the two circuits to operate at different temperatures. This may allow for more heat to be removed from oil and added to fuel of nozzle circuit 14 through fuel-oil heat exchanger 32, because the temperature of the fuel in nozzle circuit 14 is not limited by the minimum or maximum temperature requirements of servo systems 52a-52n in servo circuit 16. This also allows for servo systems 52a-52n to operate at cooler temperatures, increasing component life of components within servo systems 52a-52n.

Similarly, because servo circuit 16 and nozzle circuit 14 are separated, the circuits can operate at significantly different pressures. This may allow for nozzle fuel pump 28 to be reduced in size, because it will not need to be sized to produce the high pressures sometimes required by servo systems 52a-52n while being sized to produce high flow rates required by nozzles 38. Because of this, servo fuel pump 48 may also be reduced in size, because it need not be sized to handle the high flow rate demands of nozzles 38. Further, servo fuel pump 48 may be sized to operate at higher pressures than would be available if a single pump were used. This allows for the size of individual valves within servo systems 52a-52n to be decreased, saving cost and weight.

Also, because primary fuel pump 20, servo fuel pump 48, and nozzle fuel pump 28 are electrically powered and are not driven by the gas turbine engine's drive train, they can be sized for their respective duties, as opposed to being sized based on the minimum and maximum operating speeds of the gas turbine engine. The ability of servo fuel pump 48 and nozzle fuel pump 28 to be individually optimized for their respective consumers is a benefit that is not easily provided with single engine-driven mechanical pump systems. Further electric motors tend to be lighter and more efficient than mechanically powered pumps. This saves additional weight and energy of the aircraft fuel system.

The pumps (primary fuel pump 20, nozzle fuel pump 28, and servo fuel pump 48) used to move the fuel through the circuits may be positive displacement pumps, centrifugal type pumps, or any other type of pump appropriate for the system. Similarly the pumps may include a single pump, multiple pumps in series, or multiple pumps in parallel. For example, in embodiments where a high flow rate of fuel at a relatively low pressure is required, two or more pumps may be used in parallel to make nozzle fuel pump 28.

DISCUSSION OF POSSIBLE EMBODIMENTS

The following are non-exclusive descriptions of possible embodiments of the present invention.

A fuel supplying system includes a primary circuit for distributing fuel from a fuel tank to a primary circuit outlet. The system also includes a first supply circuit connected to the primary circuit outlet, the first supply circuit comprising a first supply circuit pump configured to pump fuel from the primary circuit outlet to engine fuel nozzles. The system further includes a second supply circuit also connected to the primary circuit outlet. The second supply circuit includes at least one actuating device configured to receive power from hydraulic pressure of the fuel. The second supply circuit also includes a second supply circuit pump configured to pump fuel from the primary circuit outlet to an actuating device, wherein the second supply circuit pump is independent from the first supply circuit pump. The second supply circuit further includes a return circuit configured to return fuel from the actuating device to the second supply circuit between the primary circuit outlet and the second supply circuit pump.

The system of the preceding paragraph can optionally include, additionally and/or alternatively, any one or more of the following features, configurations and/or additional components.

The primary circuit includes a primary pump for pumping fuel from the fuel tank to the primary circuit outlet.

A controller is configured to control the flow rate of the primary pump based on flow rates of the first supply circuit pump and the second supply circuit pump.

The first and second supply circuit pumps can be electric pumps.

A first fuel sensor, located in the first supply circuit, can produce a first sensor signal that is a function of a sensed parameter of the first supply circuit.

The first fuel sensor can be a fuel flow sensor for detecting a flow rate of fuel pumped by first supply circuit pump.

A controller can receive the first sensor signal from the first fuel sensor, perform a calculation based on the first sensor signal, and provide a drive signal to the first supply circuit pump.

The fuel sensor can send the first sensor signal to the controller, which controls the first supply circuit pump to provide a fuel flow rate based on a calculation performed based on the first sensor signal and a fuel nozzle demand signal.

A second fuel sensor, located in the second supply circuit, can produce a second sensor signal that is a function of a sensed parameter of the second supply circuit.

The second fuel sensor can be a fuel temperature sensor.

A controller can receive the second sensor signal from the second fuel sensor, perform a calculation based on the second sensor signal, and provide a drive signal to the second supply circuit pump.

The second fuel sensor can send the second sensor signal to the controller, which controls the second supply circuit pump to provide a fuel flow rate based on a calculation performed based on the second sensor signal and an actuating device demand signal.

The actuating devices can be servo systems for controlling fluid flow of an aircraft turbine engine. The controller can perform a freeze condition calculation based on the second sensor signal to detect a freeze condition. The controller can provide a drive signal to the second supply circuit pump when a freeze condition is detected, and the drive signal can be sent to the second supply circuit pump until the freeze condition is no longer detected by the controller.

The actuating devices can be servo systems for controlling fluid flow of an aircraft turbine engine.

A method for supplying fuel to engine fuel nozzles and actuating devices includes passing fuel from a fuel tank through a primary circuit to a primary circuit outlet. The method also includes pumping fuel from the primary circuit outlet, through a first supply circuit to engine fuel nozzles, wherein a first supply circuit pump is used to pump fuel through the first supply circuit. The method further includes pumping fuel from the primary circuit outlet, through a second supply circuit to actuating devices configured to receive power from hydraulic pressure of the fuel, wherein a second supply circuit pump is used to pump fuel through the second supply circuit.

The method of the preceding paragraph can optionally include, additionally and/or alternatively, any one or more of the following features, configurations and/or additional components or steps.

The first and second supply circuit pumps can be independently driven by electric motors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for supplying fuel, the system comprising:
   a primary circuit for delivering fuel from a fuel tank to a primary circuit outlet;
   a first supply circuit connected to the primary circuit outlet, the first supply circuit comprising a first supply circuit pump configured to pump fuel from the primary circuit outlet to engine fuel nozzles;
   a second supply circuit also connected to the primary circuit outlet, the second supply circuit comprising:
      an actuating device configured to receive power from hydraulic pressure of the fuel;
      a second supply circuit pump configured to pump fuel from the primary circuit outlet to the actuating device, wherein the second supply circuit pump is independent from the first supply circuit pump;
      a return circuit configured to return fuel from the actuating device to the second supply circuit between the primary circuit outlet and the second supply circuit pump; and
      a second supply circuit fuel sensor that produces a second supply circuit sensor signal as a function of a sensed parameter of the second supply circuit; and
   a controller configured to perform a freeze condition calculation based on the second supply circuit sensor signal to detect a freeze condition, wherein the controller is further configured to provide a drive signal to the second supply circuit pump when the freeze condition is detected, and wherein the controller is further configured to send a drive signal to the second supply circuit pump until the freeze condition is no longer detected by the controller.

2. The system of claim 1, wherein the primary circuit includes a primary pump for pumping fuel from the fuel tank to the primary circuit outlet.

3. The system of claim 2, wherein the controller is further configured to control the flow rate of the primary pump based on flow rates of the first supply circuit pump and the second supply circuit pump.

4. The system of claim 1, wherein the first and second supply circuit pumps are electric pumps.

5. The system of claim 4 and further comprising a first supply circuit fuel sensor, located in the first supply circuit, for producing a first supply circuit sensor signal that is a function of a sensed parameter of the first supply circuit.

6. The system of claim 5, wherein the first supply circuit fuel sensor is a fuel flow sensor for detecting a flow rate of fuel pumped by the first supply circuit pump.

7. The system of claim 5, wherein the controller is further configured to receive the first supply circuit sensor signal from the first supply circuit fuel sensor, perform a calculation based on the first supply circuit sensor signal, and provide a drive signal to the first supply circuit pump.

8. The system of claim 7 wherein the first supply circuit fuel sensor is configured to send the first supply circuit sensor signal to the controller, which is configured to control the first supply circuit pump to provide a fuel flow rate based on a calculation performed by the controller as a function of the first supply circuit sensor signal and a fuel nozzle demand signal.

9. The system of claim 1, wherein the second supply circuit fuel sensor is a fuel temperature sensor.

10. The system of claim 1, wherein the second supply circuit fuel sensor is configured to send the second supply circuit sensor signal to the controller, which is configured to control the second supply circuit pump to provide a fuel flow rate based on a calculation performed by the controller as a function of the second supply circuit sensor signal and an actuating device demand signal.

11. The system of claim 1, wherein the actuating device is a servo system for controlling fluid flow of an aircraft turbine engine.

12. A method for supplying fuel to engine fuel nozzles and actuating devices, the method comprising:
   passing fuel from a fuel tank through a primary circuit to a primary circuit outlet;
   pumping fuel from the primary circuit outlet, through a first supply circuit to engine fuel nozzles, wherein a first supply circuit pump is used to pump fuel through the first supply circuit; and
   pumping fuel from the primary circuit outlet, through a second supply circuit to actuating devices configured to receive power from hydraulic pressure of the fuel, wherein a second supply circuit pump is used to pump fuel through the second supply circuit;
   sensing a parameter of the second supply circuit;
   producing a second supply circuit sensor signal as a function of the sensed parameter of the second supply circuit;
   performing a freeze condition calculation based on the second supply circuit sensor signal to detect a freeze condition;
   providing a drive signal to the second supply circuit pump when a freeze condition is detected; and
   sending a drive signal to the second supply circuit pump until the freeze condition is no longer detected by the controller.

13. The method of claim 12 and further comprising:
   independently driving the first and second supply circuit pumps.

* * * * *